US011556647B2

(12) United States Patent
Shuai et al.

(10) Patent No.: US 11,556,647 B2
(45) Date of Patent: Jan. 17, 2023

(54) SYSTEM FOR DETECTING TROJANS IN AN ARTIFICIAL NETWORK AND METHOD THEROF

(71) Applicant: BAE Systems Information and Electronic Systems Integration Inc., Nashua, NH (US)

(72) Inventors: Jonathan Shuai, San Diego, CA (US); Ty M. Danet, La Jolla, CA (US); Kalyanaraman Vaidyanathan, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 372 days.

(21) Appl. No.: 16/834,461

(22) Filed: Mar. 30, 2020

(65) Prior Publication Data
US 2021/0303686 A1    Sep. 30, 2021

(51) Int. Cl.
*G06F 21/00* (2013.01)
*G06F 21/56* (2013.01)
(Continued)

(52) U.S. Cl.
CPC ......... *G06F 21/566* (2013.01); *G06K 9/6215* (2013.01); *G06K 9/6256* (2013.01); *G06N 3/0445* (2013.01); *G06N 7/005* (2013.01)

(58) Field of Classification Search
CPC .... G06N 7/005; G06N 3/0445; G06K 9/6256; G06K 9/6215; G06F 21/566
(Continued)

(56) References Cited

U.S. PATENT DOCUMENTS 11,132,444 B2 *   9/2021   Carvalho ............... G06N 3/08
2017/0243140 A1   8/2017   Achin et al.
(Continued)

FOREIGN PATENT DOCUMENTS

WO    2019/014487 A1    1/2019

OTHER PUBLICATIONS

Gupta et al. Feedback GAN (FBGAN) for DNA: a novel feedback-loop architecture for optimizing protein functions, arXiv preprint arXiv:1804.01694 (2018). [online], [retrieved on May 14, 2021]. Retrieved from the Internet <URL:https://arxiv.org/pdf/1804.01694>, entire document, especially p. 3 Section 2.2.
(Continued)

*Primary Examiner* — Josnel Jeudy
(74) *Attorney, Agent, or Firm* — Sand, Sebolt & Wernow LPA; Gary McFaline (57) ABSTRACT

A system and method is provided that tests and determines whether candidate artificial intelligence model contains a Trojan from when it was trained and using the outcome determination of the Trojan to determine whether the candidate artificial intelligence model should be deployed. The system utilizes a first artificial intelligence that operates as a data generator and a second artificial intelligence that operates as a discriminator to determine whether the candidate artificial intelligence contains a Trojan. The first artificial intelligence combines sets of data with random Trojan triggers and the second artificial intelligence discriminates output classifications from the candidate artificial intelligence model to determine whether the Trojan is present based on probability outputs.

16 Claims, 4 Drawing Sheets

(51) Int. Cl.
  *G06K 9/62*   (2022.01)
  *G06N 3/04*   (2006.01)
  *G06N 7/00*   (2006.01)
(58) Field of Classification Search
  USPC .......................................................... 726/24
  See application file for complete search history.

(56) References Cited

U.S. PATENT DOCUMENTS

2019/0130903 A1   5/2019  Sriram et al.
2020/0394451 A1*  12/2020 Baijal ..................... G06N 7/005
2021/0287128 A1*  9/2021  Han ........................ G06K 9/628
2022/0067588 A1*  3/2022  Buttner ............... G06F 21/6218

OTHER PUBLICATIONS

International Search Report, PCT/US21/24768, dated Jun. 9, 2021, 10 pages.

* cited by examiner

SYSTEM FOR DETECTING TROJANS IN AN ARTIFICIAL NETWORK AND METHOD THEROF

TECHNICAL FIELD

The present disclosure relates to a system and architecture for utilizing multiple artificial neural networks to determine whether a candidate artificial intelligence is infected with Trojans that would result in misclassifications if the candidate artificial intelligence were to be deployed as a classifier.

BACKGROUND

A neural network involves a network of simple processing elements (artificial neurons) which can exhibit complex global behavior, determined by the connections between the processing elements and element parameters. One classical type of artificial neural network is the recurrent Hopfield net. In a neural network model simple nodes, which can be called variously "neurons", "neurodes", "Processing Elements" (PE) or "units", are connected together to form a network of nodes—hence the term "neural network".

A neural network (NN), in the case of artificial neurons is called artificial neural network (ANN) or simulated neural network (SNN), is an interconnected group of artificial neurons that uses a mathematical or computational model for information processing based on a connectionist approach to computation. In most cases an ANN is, in formulation and/or operation, an adaptive system that changes its structure based on external or internal information that flows through the network. Modern neural networks are non-linear statistical data modeling tools. They are usually used to model complex relationships between inputs and outputs or to find patterns in data. In more practical terms neural networks are non-linear statistical data modeling or decision making tools. They can be used to model complex relationships between inputs and outputs or to find patterns in data.

A convolutional neural network (CNN, or ConvNet) is a class of deep neural networks, most commonly applied to analyzing visual imagery. They are also known as shift invariant or space invariant artificial neural networks (SIANN), based on their shared-weights architecture and translation invariance characteristics. They have applications in image and video recognition, recommender systems, image classification, medical image analysis, natural language processing, and financial time series.

Algorithms in NN are used for learning. There are three major learning paradigms, each corresponding to a particular abstract learning task. These are supervised learning, unsupervised learning and reinforcement learning. Usually any given type of network architecture can be employed in any of those tasks. In supervised learning, there are a given a set of examples (for example pairs $(x,y)$, $x \varepsilon X$, $y \varepsilon Y$) and the aim is to find a function $f$ in the allowed class of functions that matches the examples. In other words, the supervised learning algorithm infers how the mapping implied by the data and the cost function is related to the mismatch between the mapping and the data. In unsupervised learning, there is given data x, and a cost function which is to be minimized which can be any function of x and the network's output, $f$. The cost function is determined by the task formulation. Most applications fall within the domain of estimation problems such as statistical modeling, compression, filtering, blind source separation and clustering. In reinforcement learning, data x is usually not given, but generated by an agent's interactions with the environment. At each point in time t, the agent performs an action yt and the environment generates an observation xt and an instantaneous cost ct, according to some (usually unknown) dynamics. The aim is to discover a policy for selecting actions that minimizes some measure of a long-term cost, i.e. the expected cumulative cost. The environment's dynamics and the long-term cost for each policy are usually unknown, but can be estimated. ANNs are frequently used in reinforcement learning as part of the overall algorithm. Tasks that fall within the paradigm of reinforcement learning are control problems, games and other sequential decision making tasks. These will be discussed in further detail below.

There are many algorithms for training neural networks; most of them can be viewed as a straightforward application of optimization theory and statistical estimation. They include: Back propagation by gradient descent, Rprop, BFGS, CG etc. Evolutionary computation methods, simulated annealing, expectation maximization, non-parametric methods, particle swarm optimization and other swarm intelligence techniques are among other commonly used methods for training neural networks.

Neural network models in artificial intelligence are usually referred to as artificial neural networks (ANNs); these are essentially simple mathematical models defining a function $f:X \rightarrow *Y$. Each type of ANN model corresponds to a class of such functions. The word network in the term 'artificial neural network' arises because the function $f(x)$ is defined as a composition of other functions $gi(x)$, which can further be defined as a composition of other functions. This can be conveniently represented as a network structure, with arrows depicting the dependencies between variables.

The possibility of learning has generated significant interest in neural networks. Given a specific task to solve, and a class of functions F, learning means using a set of observations to find $f^* \varepsilon F$ which solves the task in some optimal sense. This entails defining a cost function $C:F \rightarrow$ such that, no solution has a cost less than the cost of the optimal solution.

The cost function C is an important concept in learning, as it is a measure of how far away a particular solution is from an optimal solution to the problem to be solved. Learning algorithms search through the solution space to find a function that has the smallest possible cost. For applications where the solution is dependent on some data, the cost must necessarily be a function of the observations, otherwise we would not be modeling anything related to the data. It is frequently defined as a statistic to which only approximations can be made.

While it is possible to define some arbitrary, ad hoc cost function, frequently a particular cost will be used, either because it has desirable properties (such as convexity) or because it arises naturally from a particular formulation of the problem (e.g., in a probabilistic formulation the posterior probability of the model can be used as an inverse cost). Ultimately, the cost function will depend on the task to be performed. As stated previously, there are three major learning paradigms, each corresponding to a particular abstract learning task. These are supervised learning, unsupervised learning and reinforcement learning. Usually any given type of network architecture can be employed in any of those tasks.

Training a neural network model essentially means selecting one model from the set of allowed models (or, in a Bayesian framework, determining a distribution over the set of allowed models) that minimizes the cost criterion. There are numerous algorithms available for training neural network models; most of them can be viewed as a straightforward application of optimization theory and statistical estimation. Most of the algorithms used in training artificial neural networks employ some form of gradient descent. This is done by simply taking the derivative of the cost function with respect to the network parameters and then changing those parameters in a gradient-related direction. Evolutionary methods, simulated annealing, expectation-maximization and non-parametric methods are some commonly used methods for training neural networks. Temporal perceptual learning relies on finding temporal relationships in sensory signal streams. In an environment, statistically salient temporal correlations can be found by monitoring the arrival times of sensory signals. This is done by the perceptual network.

However, training these types of artificial intelligence networks is where a problem may arise inasmuch as training for neural networks is normally accomplished via outsourcing or open sources with little to no security. Due to open source training, there exists an opportunity for an adversary to improperly place a "Trojan" into the artificial intelligence network (i.e., a Trojan horse; the term Trojan used herein refers to a model that, when exposed to a specific trigger input, will produce an unexpected output for the user). An adversary could train an artificial intelligence network to "learn" that a threat marker is not a threat. For example, an adversary could train an artificial intelligence network to learn that frequencies signatures output from a missile or projectile to be that of non-threats, such as birds. In this instance, the model "learns" that threats are actually non-threats, which is clearly a significant problem for the operator of the network.

SUMMARY

In deep learning, many models or artificial intelligence networks are pre-trained by outsourcing the labeling of data. The outsourcing of data labeling allows for the opportunities for adversary to cause a problem. Thus, there continues to be a need for additional layers of security with these types of neural networks and artificial intelligence. The present disclosure addresses these and other issues by providing an improved model or neural network architecture that can detect whether a Trojan has been inserted into the models that are used to classify and discriminate information. During the learning process, there is human interaction that requires some data sources to be identified so that the neural network or artificial intelligence can further identify future inputs. For example, during the training and learning process, the network may be exposed to a plurality of different images of trees. However, an adversary could insert a Trojan by falsely labeling an object that is not a tree as a tree. This would cause the artificial intelligence network to train and learn to identify the improperly labeled objects as trees. Clearly this high level example is for generality purposes. However, it can be envisioned that for electronic warfare, it is possible for an adversary to identify threats as non-threats. For example, if a machine is trying to learn frequencies relating to a threat object, an adversary can insert a Trojan to say that these frequencies are non-threats such as birds chirping or wind blowing when in reality the frequency of the sounds could relate to an approaching missile.

With the rise of adversarial artificial intelligence (AI), a very important area of research is a manner to automatically inspect artificial intelligence and machine learning systems to see if it has been tampered with. Adversarial AI attacks that insert information or images into machine-learning training data seek to trick the system into incorrectly classifying what has been presented. The problem that is solved by the present disclosure is the detection of "Trojans" in machine learning/AI neural network models. A neural network that has a Trojan is defined as a network that has been modified to make a misclassification when a particular trigger is present in the input. For example, a "Trojaned" network could misclassify a stop sign as a speed limit sign if a sticky note is placed on the stop sign. These Trojans can be inserted by manipulation of the data or the model weights by an adversary. This is a challenging problem because the weights in neural networks are famously difficult to interpret and analyze, and we have no good way of telling whether a Trojan is present in a network or not. This can be very dangerous for sensitive applications (such as intelligence and defense applications) where security is important. By nature, an AI Trojan trigger should cause misclassifications robustly, and be relatively small and discreet to human detection. Small changes in the input (such as a post-it on a stop sign) causes large changes in the output probability.

Issues continue to exist with Trojans being placed into artificial intelligence programming language or software since many modern algorithms are outsourced or open sourced. In these open sourced or outsourced environments, there is often very little to no security for the data or the training process. During this training, Trojans could be inserted into the algorithm by an adversary. Thus, the present disclosure provides the advantages of providing a system that finds whether the model is compromised with a Trojan.

An exemplary system of the present disclosure uses deep learning to identify whether a neural network has a Trojan or not. This is done by testing inputs on a given neural network, and using the outputs of the network, make a determination whether that candidate network has a Trojan or not. This exemplary systems has advantages and solution that is believed to be an improvement over other existing solutions for a number of reasons: 1. This technique is agnostic to the internal architecture of the network in question (meaning the system can take any model and determine whether there is a Trojan). 2. The system has very promising performance in initial tests (up to 98% accuracy in one case with just 900 training examples). 3. The system makes very few assumptions about the nature of the Trojan (i.e., it makes no hard assumptions about the size of the trigger, the targeted classes, and the method of injection). Many previous systems make strong assumptions about the Trojan and information available, which make them limited in scope. 4. Training data for this algorithm can be generated automatically. 5. No other algorithm known to the inventors uses deep learning and can achieve the accuracy that this system has demonstrated in initial tests.

Previous state of the art methods use backpropagation to find inputs to test the probability space and perform a search on those probabilities to determine whether a Trojan is present in a candidate artificial intelligence. In an exemplary embodiment of the present disclosure, instead of using the optimization method to find inputs for each class, this system and method uses an input generator G to generate inputs that will provide a discriminative representation of the output probability manifold of the test or candidate artificial intelligence network model. The system and method then use this discriminative representation as input to a Trojan detection network or discriminator D, which will provide the probability of a Trojan, using the discriminative output probability space representation. More specifically, the input generator G will be conditioned on previously generated images and output class logits from the test or candidate artificial intelligence network model in a recurrent neural network fashion. In this exemplary embodiment, $X_t$ represents a generated input at time step t, and $Z_t$ represents the output class logits for time step t. Generated inputs are fed into the test or candidate artificial intelligence network model to test F to get class logits. The input generator network G uses previously generated inputs and class logits to generate its next image. The output detector network or discriminator D that may be an LSTM (Long Short-Term Memory) network that outputs the probability of the AI having a Trojan, (y).

In one exemplary embodiment, the two artificial intelligence networks G and D are trained together, as G depends on D to make good input suggestions, and D depends on G's generated inputs to determine the probability of a Trojan. In one example, this method was viable using randomly generated CNN (Convolutional Neural Network) architectures (with varying kernel sizes, filters, number of layers, activation functions, data splits) trained on the MNIST dataset. Trojans were inserted by adding a Trojan trigger patch to random images and relabeling them to randomly selected target labels. Architectures with accuracy <70% were discarded, and all Trojan triggers map the image to the target label with >90% success rate. We generated 900 training CNNs and 100 validation CNNs. After training the above architecture for 2 epochs, we achieved an Accuracy/Precision/Recall of 0.98/0.98/0.96 on the validation set. Another example tested this method on a more varied dataset. This time, random CNN architectures were generated to make classifications for the CIFAR-10 dataset, with Trojan triggers being random polygon crops of random images. A subset of 5 random classes were chosen for each CNN to train. In this experiment, we generate just 150 training CNNs and 50 validation CNNs. In this test, the system achieved an Accuracy/Precision/Recall of 0.84/0.83/0.87 on the validation set. System performance can be improved with more training CNNs. In other instances, longer sequences of test inputs and output class logits should give the more discriminative information the Trojan detection network and improve results for a prediction. These tests were all done using just 10 outputs. While the variation in the dataset for this test is relatively limited, its performance and stability was very good, and with more work the system can be trained to generalize to a wider variety of architectures. One advantage shown in this approach is that this internal architecture is agnostic, i.e., this does not require any knowledge about the inner workings of the artificial intelligence to test the candidate model network to determine whether it has Trojans.

In one aspect, an exemplary embodiment of the present disclosure may provide a method comprising: providing a candidate artificial intelligence model that has been trained; coupling the candidate artificial intelligence between a first artificial intelligence and a second artificial intelligence; inputting a first set of data into the first artificial intelligence; generating a first logit from the first artificial intelligence; inputting the first logit into the candidate artificial intelligence model; outputting a second logit from the candidate artificial intelligence model that is representative of a classification classified by candidate artificial intelligence model; inputting the second logit into the second artificial intelligence; and determining, via the second artificial intelligence, whether the candidate artificial intelligence model includes a Trojan from when it was trained based on the classification as classified by the candidate artificial intelligence model. This exemplary embodiment or other embodiments may further comprise generating a Trojan trigger; inputting the Trojan trigger into the first set of data in the first artificial intelligence; generating a subsequent logit output from the first artificial intelligence based on the Trojan trigger in the first set of data and feeding the subsequent logit to the candidate artificial intelligence model. This exemplary embodiment or other embodiments may further comprise comparing, in the second artificial intelligence, the output of the candidate artificial intelligence model based on the first set of data with the output of the candidate artificial intelligence model based on the first set of data having the Trojan trigger; determining, based on a probability determination from the second artificial intelligence, whether the candidate artificial intelligence model includes the Trojan from when the candidate artificial intelligence was trained based on the comparison between the output of the candidate artificial intelligence model from the first set of data and the output of the candidate artificial intelligence model from the first set of data having the Trojan trigger. This exemplary embodiment or other embodiments may further comprise wherein if the second artificial intelligence determines that the candidate artificial intelligence model has the Trojan, then discarding the candidate artificial intelligence model; and wherein if the second artificial intelligence determine that the candidate artificial intelligence model does not have the Trojan, then deploying the candidate artificial intelligence model in a subsequent system. This exemplary embodiment or other embodiments may further comprise wherein the step of determining is accomplished by comparing a change of the second logit before and after having added the Trojan trigger to the first set of data.

This exemplary embodiment or other embodiments may further comprise feeding, via a first feedback loop, the first logit back to the first artificial intelligence; feeding, via a second feedback loop, the second logic output from the candidate artificial intelligence mode back to the first artificial intelligence. This exemplary embodiment or other embodiments may further comprise generating subsequent sets of data with Trojan triggers added to the first and second logits that have been fed back to the first artificial intelligence.

This exemplary embodiment or other embodiments may further comprise determining, in the second artificial intelligence operating as a discriminator, whether the second logit from the candidate artificial intelligence model is a true representation or a false representation of the first logit. This exemplary embodiment or other embodiments may further comprise determining, in the discriminator, whether the candidate artificial intelligence model correctly classified an object based on perturbations in the first logit. This exemplary embodiment or other embodiments may further comprise generating perturbations in the first set of data input into the first artificial intelligence to create a perturbed first set of data; transmitting the original first set of data to the candidate artificial intelligence model; transmitting the perturbed first set of data to the candidate artificial intelligence model; generating, via the candidate artificial intelligence model, a classification based on the original first data and a classification based on the perturbed first data; comparing in the discriminator the classification based on the original first data and the classification based on the perturbed first data; determining whether the Trojan exists in the candidate artificial intelligence model based on whether the classification of the original first data and the classification of the perturbed first data are similar or different. This exemplary embodiment or other embodiments may further comprise repetitively generating additional perturbations in at least one of the first set of data and the perturbed first set of data;

repetitively generating, via the candidate artificial intelligence model, classifications based on the at least one of the first set of data and the perturbed first set of data. This exemplary embodiment or other embodiments may further comprise repetitively generating additional perturbations in both the original first set of data and the perturbed first set of data; repetitively generating, via the candidate artificial intelligence model, classifications based on both of the first set of data and the perturbed first set of data. This exemplary embodiment or other embodiments may further comprise wherein the first set of data is a first image input into the first artificial intelligence; wherein the perturbations are formed by generating noise from a random noise generator connected to the first artificial intelligence; combining the noise with the first image; transmitting the first image and noise to the candidate artificial intelligence model; and outputting a classification of the first image and noise from the candidate artificial intelligence. This exemplary embodiment or other embodiments may further comprise triggering a Trojan implanted in the candidate artificial intelligence model to misclassify an object in the first image based on the random noise combined with the first image; and detecting the misclassification of the object in the first image via the second artificial intelligence operating as a discriminator connected with the candidate artificial intelligence.

This exemplary embodiment or other embodiments may further comprise wherein the first set of data is a sound signature input into the first artificial intelligence; wherein the perturbations are formed by generating noise from a random noise generator connected to the first artificial intelligence; combining the noise with the sound signature transmitting the sound signature and noise to the candidate artificial intelligence model; outputting a classification of the sound signature and noise from the candidate artificial intelligence.

This exemplary embodiment or other embodiments may further comprise determining that the candidate artificial intelligence model contains the Trojan; disconnecting the candidate network model from the first artificial intelligence and the second artificial intelligence; discarding the candidate network model; connecting a second candidate network model to the first artificial intelligence and the second artificial intelligence; and testing the second candidate network model to determine whether the second candidate network model contains a second Trojan in a similar manner to that of the candidate artificial intelligence.

In yet another aspect, an exemplary embodiment of the present disclosure may provide a system and method is provided that tests and determines whether candidate artificial intelligence model contains a Trojan from when it was trained and using the outcome determination of the Trojan to determine whether the candidate artificial intelligence model should be deployed. The system utilizes a first artificial intelligence that operates as a data generator and a second artificial intelligence that operates as a discriminator to determine whether the candidate artificial intelligence contains a Trojan. The first artificial intelligence combines sets of data with random Trojan triggers and the second artificial intelligence discriminates output classifications from the candidate artificial intelligence model to determine whether the Trojan is present based on probability outputs.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
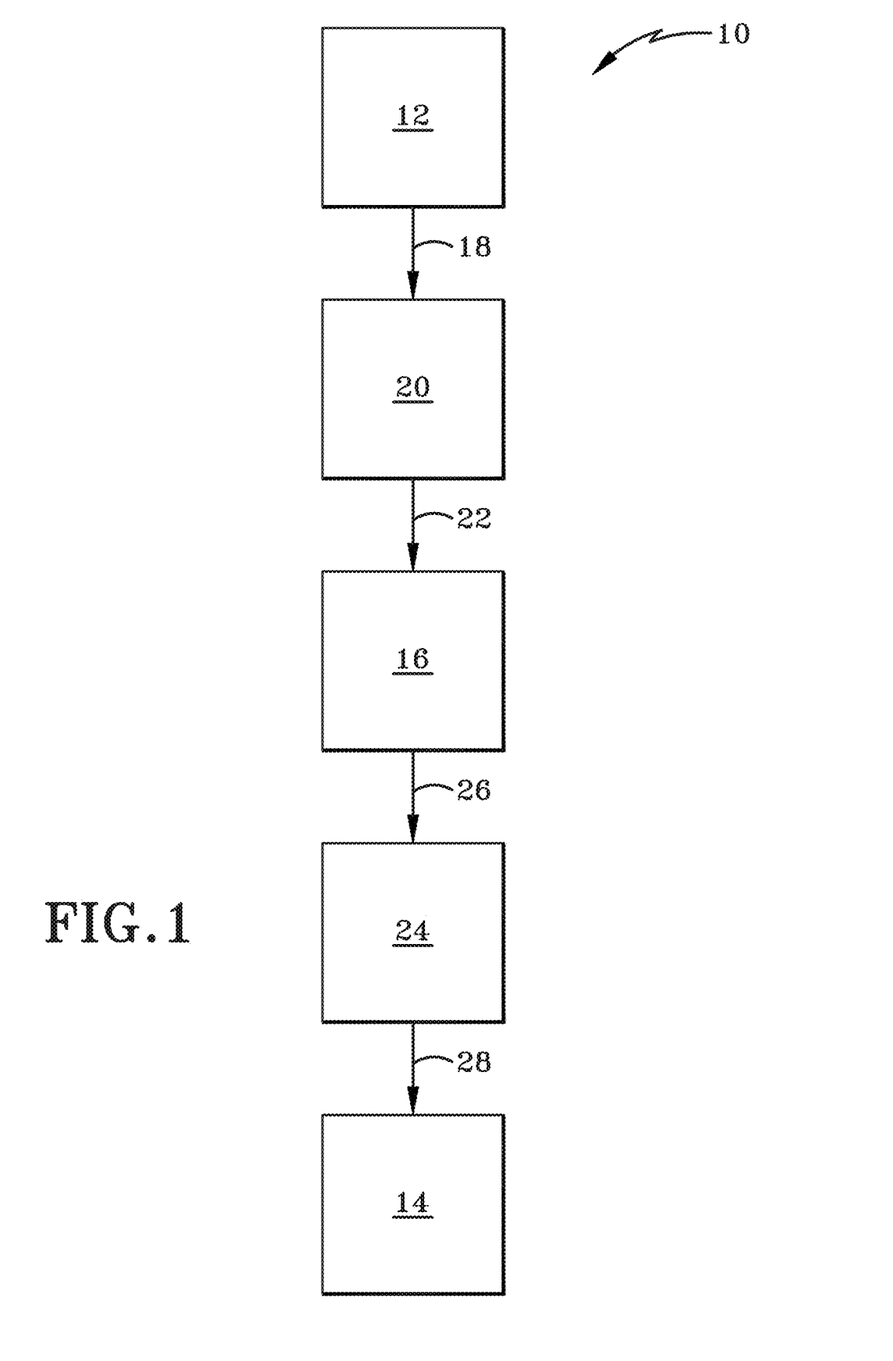
FIG. 1 is a schematic flow chart of a system for determining whether a candidate artificial intelligence model contains a Trojan from when it was trained in accordance with an exemplary aspect of the present disclosure.

A system for detecting Trojans within a candidate artificial intelligence or model is shown generally at 10. System 10 includes a first artificial intelligence 12, a second artificial intelligence 14, and a candidate artificial intelligence model 16 having a generally unknown origin that needs to be tested to determine whether it contains Trojans implemented therein from when it was trained. System 10 is configured to determine whether the candidate artificial intelligence model 16 was trained improperly to output results that would be problematic if the candidate network model were used to classify data as is typical with convolutional neural networks. If the candidate artificial intelligence model 16 passes the test based on the system determining that there are no Trojans present therein, then the candidate artificial intelligence mode may be disconnected from the system and deployed in another environment with the implementer having the knowledge that misclassifications resulting from Trojans are unlikely.

First artificial intelligence 12 outputs data along link 18, which may be a wired or wireless link. Link 18 enables outputs from the first artificial intelligence 12 to be considered an input 20 to the candidate network model 16. The data output from the first artificial intelligence 12 is an input 20 along link 22 to the candidate network model 16. Candidate network model 16 is coupled to logits 24 via link 26. Logits 24 are coupled with the second artificial intelligence 14 via link 28.

First artificial intelligence 12 may be any type of artificial intelligence. According to an exemplary embodiment, the first artificial intelligence 12 is a convolutional neural network. The first artificial intelligence 12 operates as an input generator to generate input data. In some instances, the data generated by the first artificial intelligence 12 operating as a generator generates images. In other instances, other types of data may be generated that would be designed to be fed to the candidate network model 16 that is to be tested to determine whether it has a Trojan implanted in it from when it was trained via an open source training process or methodology.

When the first artificial intelligence 12 operates as a data generator, the output of the first artificial intelligence 12 sent via link 18 is an input 20 to the candidate network model 16 along link 22. In one particular embodiment, the candidate network model 16 is also a convolutional neural network that is used to classify the images input 20 thereto. If the network model has Trojans that improperly classify data as something that it is not, then the system 10 is able to determine whether the candidate network model is corrupted and should be discarded and not used in other classification systems or methods.

Logits 24 output from the candidate network model 16 are input via link 28 into the second artificial intelligence 14. In this embodiment, the second artificial intelligence 14 is operating as a discriminator or Trojan detector. In one particular embodiment, the second artificial intelligence 14 operating as a detector or discriminator is a Long Short-Term Memory (LSTM) network that outputs the probability that the candidate network model 16 has a Trojan, p(y).

Figure 2:
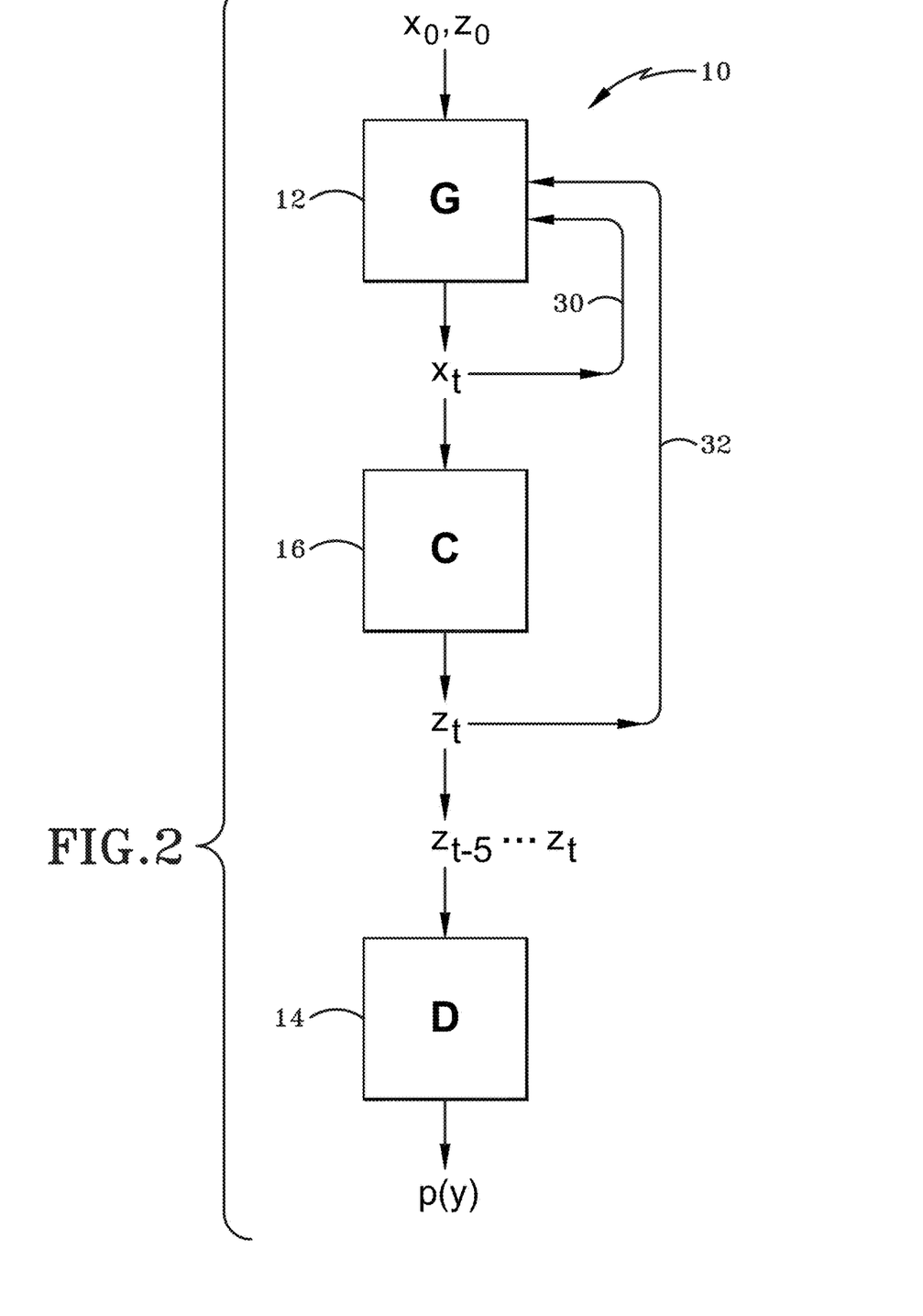
FIG. 2 is a flow chart depicting an exemplary method of operation of the system for determining whether the candidate artificial intelligence model contains a Trojan.

FIG. 2 depicts system 10 having input data or an input image $X_0$ and output logits $Z_0$. The input image $X_0$ and logits $Z_0$ are randomly initialized and input to the first artificial intelligence 12 operating as a data generator G. The input generator G (first artificial intelligence 12) receives the input data at time (t−1) $X_{t-1}$ and the logit at the same time (t−1) $Z_{t-1}$ and the data generator G generates the next image or set of data, $X_t$. The image $X_t$ is fed to the candidate network model 16 which is shown as candidate C. The image $X_t$ is also fed back to the input generator G along a first feedback loop 30. The Trojan candidate model C (candidate network model 16) is fed the synthetic image $X_t$ and output logits Z. The output logits 4 are fed back to the generator G (first artificial intelligence G along a second feedback loop 32. After feeding 4 along second feedback loop 32, the generator G generates another image $X_{t+1}$. The output logits 4 are also fed to the second artificial intelligence 14 operating as a discriminator D. This process is repeated so that a plurality of logits $Z_{t-N} \ldots Z_t$ are fed to the discriminator D. In one embodiment, the last five logits $Z_t$ are fed to the discriminator D. However, another amount of logits can be fed to the discriminator D. When using the previous five logits $Z_{t-5} \ldots Z_t$, the discriminator D is an LSTM, however other scenarios may use other types of artificial intelligences other than an LSTM.

To determine whether the model is compromised requires the architecture of a neural network identified in FIG. 2. FIG. 2 depicts the general adversarial network of the present disclosure. The general adversarial network of the present disclosure includes the two networks 12, 14 that work in tandem. There is a generator G (first artificial intelligence 12) and a discriminator D (second artificial intelligence 14). The generator G tries to fool or trick the discriminator D. The discriminator D is trying to identify all the data that is passed to it is identified as real or fake.

Usually, Trojans are very small changes that a human will either ignore or just not notice. For example, a frequent example of a Trojan is a small sticker or other debris located on a stop sign. During the learning process, a human will identify the stop sign as a stop sign regardless of the sticker being placed on it. However, during training, the sticker causes the networks to learn that the foreign object covering a portion of the stop sign could allow stop signs to have differing features. This results in misclassifications in the discriminator. Thus, the sticky note itself would be considered a Trojan in the model.

Towards this end, the generator generates small perturbations into the images. The images with the small perturbations are sent into the Trojan candidate model. The Trojan candidate model will then output this to the discriminator. The discriminator will look at all of its past outputs to see whether some small change results in a large output variance.

In operation with reference to FIG. 2, input images are input into the generator network. Additionally, end noise is input into the generator G network. Random noise is generated by a random noise generator. From the random noise, generator network creates an output that tries to generate the Trojan trigger that will cause the candidate model to classify the output image from the generator as an incorrect identification of an object.

The original image $X_0$ is input into the input generator. For example, the input image may be a traditional stop sign without any sticker or perturbations on it. The random noise generator adds random noise to the original image $X_0$ to output logits. Logits are used in a classifier neural network in which an output is put into a soft mat function which will provide probabilities of what the image or data to be classified is. Probabilities will identify a number one for the most probable object and a zero for less probably objects or any number between one and zero. The closer to one the more likely the object is to be correctly classified. Logits are vectors that are as long as however many classes are in the classifier. Thus, the logit of FIG. 2 includes the original image $X_0$ plus random noise vectors. Over time, what is given is the actual output logits of the candidate image.

Using the input image $X_0$ and the random noise, generator will generate the next image $X_1$ or $X_t$, where t is time. The $X_t$ from the output of the generator is sent to the Trojan candidate model. The second image $X_t$ is slightly perturbed based on the random noise. The second image $X_t$ is sent into the candidate model. The candidate model processes the second image $X_t$ and outputs another logit. The Trojan candidate model at this point is a neural network that the architecture does not know whether it can trust because it needs to determine whether it would classify something as a Trojan. The Trojan candidate model could be a neural network originally created from an open source network or an open source site that the system of the present disclosure needs to determine whether it improperly classifies images or data so that the overall architecture of the artificial intelligence network can identify the quality thereof. The Trojan candidate model network operates in its normal operation to classify the second image $X_t$. It produces an output. After producing an output from the Trojan candidate model, the original input of the second image to the Trojan candidate model, which is second image $X_t$ and the output image from the Trojan candidate model are fed back through a feedback loop to the generator to create yet another image. At the same time, all of the past outputs of the Trojan candidate model are sent to the discriminator, which will analyze how the output logits from the candidate model network have changed over time. The discriminator will then provide a probability of whether the candidate model is a Trojan or not.

The discriminator is able to identify whether the Trojan candidate model is a Trojan by defining whether a small change in input to the Trojan candidate model results in a large deviation of an output. For example, if a stop sign image containing a sticker thereon is input into the Trojan candidate model and the Trojan candidate model outputs a logit identifying it as a yield sign or a speed limit sign, then the discriminator will realize that the small change to the input image (the sticker is the small input perturbation) results in an entirely different classification of the image, such as a speed limit sign or a yield sign. Stated more broadly, if there is a very small change in the input that causes a large change in the output, then the discriminator will identify the candidate model as a Trojan. In some examples, rather than all of the outputs being sent to the discriminator network, only the last five may be sent to the discriminator network. This is a function of memory storage in the neural networks. However, under optimal conditions, every previous output from the Trojan candidate model could be fed to the discriminator network if memory and processing power are of no consequence. However, if there are limitations on processing power and memory storage, then a fewer number than all of the images may be passed to the discriminator, such as five images, six images, seven images, ten images or more. The output logits from the candidate model network are probabilities and the discriminator emanates the highest probability for an output prediction.

At the outset, the discriminator and the generator should be trained together. Simultaneous training of the generator and discriminator, while not necessary, would be optimal to ensure that they are trained on the same information simultaneously so that they are operating in similar fashions. This could be beneficial because if there is a strong discriminator and a weak generator, then the discriminator would not be able to tell what is real and what is not and the generator would not have to create good quality perturbations. On the other hand, if there is a strong generator and a weak discriminator, the opposite happens. There would be a significant amount of perturbations created and the discriminator would not be strong enough identify the Trojan outputs.

In one embodiment, the generator is a convolutional neural network (CNN, the Trojan candidate model network is also a CNN, and the discriminator is long, short term memory (LSTM) network). However, the overall architecture of the present disclosure should be agnostic to the model type. Thus, while the generator and candidate models are both CNNs in one particular embodiment, other artificial intelligence networks are possible. Similarly, while the discriminator is an LSTM network in one embodiment, other artificial intelligence networks could be used for the discriminator.

Figure 3:
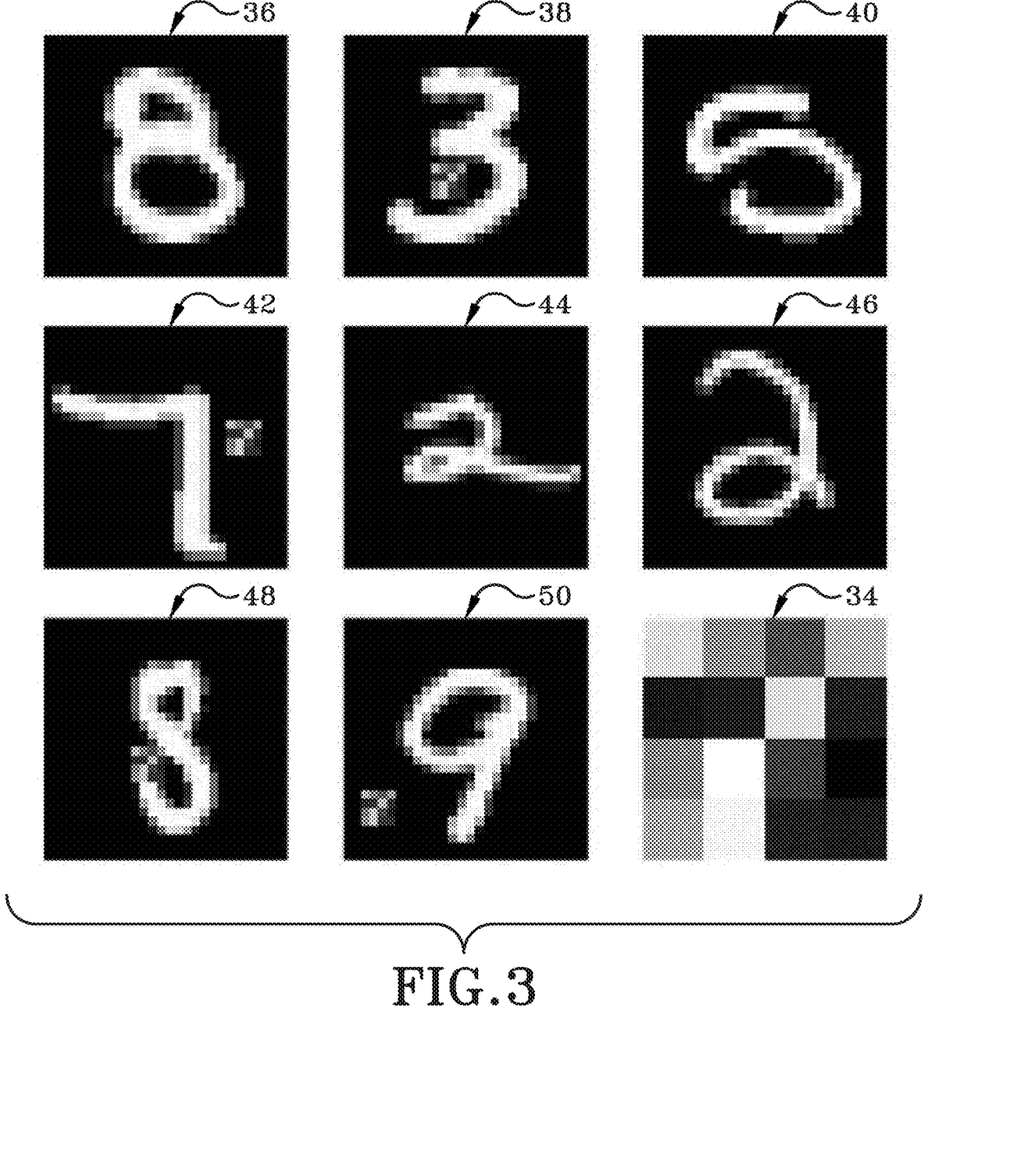
FIG. 3 is an array of pictures that are to be classified with some picture having an exemplary Trojan trigger and other pictures being free of the Trojan trigger.

FIG. 3 depicts a plurality of images that can be used by system 10 to detect whether the candidate network model 16 contains a Trojan. An exemplary Trojan trigger or Trojan trigger patch is shown at 34. Trojan trigger 34 may be randomly generated by a random data generator or random number generator. In FIG. 3, the Trojan trigger 34 appears as a small patch of perturbations or distorted data. The other images that are to be classified by the candidate model network 16 include numerical representations that should be classified. In this example, there is a first image 36, a second image 38, a third image 40, a fourth image 42, a fifth image 44, a sixth image 46, a seventh image 48, and an eighth image 50. To a human observer, it can be readily seen that the first image 36 is a number eight, the second image 38 is a number three, the third image 40 is a number five, the fourth image 42 is a number seven, the fifth image 44 is a number two, the sixth image 46 is a number two, the seventh image 48 is a number eight, and the eighth image 50 is a number 9. However, when the Trojan trigger 34 is input into one of the images (that are to be fed to the first artificial intelligence 12 operating as a generator G), then there is a possibility that the candidate network model misclassifies the respective image due to the Trojan trigger 34 having been inserted into the respective image within the generator G. For example, the first image 36 does not include the Trojan trigger 34 and the candidate network model 16 is able to correctly classify the image as a number eight. The third image 40 does not include the Trojan trigger 34 and the candidate network model 16 is able to correctly classify the image as a number five. The fifth image 44 does not include the Trojan trigger 34 and the candidate network model 16 is able to correctly classify the image as a number two. The sixth image 46 does not include the Trojan trigger 34 and the candidate network model 16 is able to correctly classify the image as a number two.

The first artificial intelligence 12 operating as a generator G inputs the Trojan trigger 34 into the second image 38. Based on the insertion of the Trojan trigger 34, the candidate network model 16 has misclassified the second image 38 by not identifying the image as a number three. The first artificial intelligence 12 operating as a generator G inputs the Trojan trigger 34 into the fourth image 42. Based on the insertion of the Trojan trigger 34, the candidate network model 16 has misclassified the fourth image 38 by not identifying the image as a number seven. The first artificial intelligence 12 operating as a generator G inputs the Trojan trigger 34 into the seventh image 48. Based on the insertion of the Trojan trigger 34, the candidate network model 16 has misclassified the seventh image 48 by not identifying the image as a number eight. The first artificial intelligence 12 operating as a generator G inputs the Trojan trigger 34 into the eighth image 50. Based on the insertion of the Trojan trigger 34, the candidate network model 16 has misclassified the eighth image 50 by not identifying the image as a number nine.

This example of images from FIG. 3 may operate in the schematic flow chart of FIG. 2 based on the following. One image, such as second image 38, may be input into the generator G and can be represented as X0. The first artificial intelligence 12 operating as generator G. The base image is output as Xt−1. The base image is fed to the candidate network model 16 while simultaneously being fed along first feedback loop 30. The image Xt−1 is classified by the candidate network model 16 as Zt. After the base image is fed back along feedback loop 30, a random data generator coupled with the first artificial intelligence 12 (i.e., generator G) generates the Trojan trigger 34 and inputs the same into the base image that has been fed back to the first artificial intelligence 12 to create the next image Xt. The image Xt containing the Trojan trigger 34 is fed to the candidate network model 16 that is to classify the same. The output logit Zt resulting from the classification of the image Xt containing the Trojan trigger 34 by the candidate network model is output to the second artificial intelligence 14 operating as the discriminator D and is also fed along feedback loop 32. This process is repeated. During each repeat, the random data generator varies the data input into the previous base image input into the generator G to create a new Trojan trigger 34. The process continues with each new Trojan trigger 34 in an image or data set being evaluated by the candidate network model 16 until a sufficient number of repetitions have been completed. In some instances, the process may be repeated at least five times, however fewer times are possible or more may be required depending on the processing power of the computer components performing the method. In one example, the process repeats until at least the previously five outputs from the candidate model can be aggregated and stored in the discriminator for evaluation. The discriminator evaluates the outputs $Z_{t-5}$, $Z_{t-4}$, $Z_{t-3}$, $Z_{t-2}$, $Z_{t-1}$, and $Z_t$. The discriminator determines whether the candidate network model 16 has been implanted with a Trojan based on the probabilities.

More particularly, the discriminator D (i.e., second artificial intelligence 14) operates by evaluating the relative change in output classification of the candidate network model 16 compared to the data that has been input into the same. For example, the discriminator determines the likelihood that the candidate network model 16 includes an implanted Trojan by seeing whether a slight change or perturbation to an original image results in a significant deviation in the output. By way of a real world example, presume that the input image is the first image 36 which depicts a number eight. When the original image passes through the candidate network model 16 it should correctly identify that the image is of a number eight. Then, the process repeats in which a Trojan trigger 34 could be applied to the first image 36. If after having the Trojan trigger 34 being applied to the image the candidate network model 16 classify the image as anything other than the number eight, the discriminator will note that the small perturbation in data input into the image has resulted in a large deviation from the original classification (i.e., a number eight).

For another example, presume the original input image is a stop sign. The image of the stop sign is input to the candidate network model 16. The candidate network mode classifies the image as a stop sign. Then, the original image is perturbed or otherwise effected with a Trojan trigger 34 which could be random digital data or could be a physical perturbation, such as a sticker on the sign. Then, the image with the perturbation or Trojan trigger is classified again by the candidate network model 16. Then, the output classification of the perturbed image containing the Trojan trigger 34 is discriminated by the discriminator D. If the output classification of the candidate network model indicates that the image is no longer a stop sign, then this would be an indicator that the candidate network model may contain a Trojan that is purposefully or accidentally misclassifying the image. For example, if the image of the stop sign containing the Trojan trigger 34 is classified as a speed limit sign or a yield sign, the discriminator D will be able to identify that the candidate network model 16 may have been improperly trained or contain a Trojan such that the candidate network model should not be used in future deployments as an artificial intelligence classifier.

System 10 does not need to operate only with images. System 10 works equally well with data analysis to determine whether a Trojan exists within a candidate network model that is to be deployed as an artificial intelligence classifier. For this example, presume the original data is digital data representing a sound. For example, the sound can be a sound signature of a threat, such as a missile or other adversarial device intended to destroy/harm the operator. The digital data of the original threat signature is input to the candidate network model 16. The candidate network mode classifies the data/signature as a threat. Then, the original data is perturbed or otherwise effected with a Trojan trigger 34 which could be random digital data. Then, the data signature with the perturbation or Trojan trigger is classified again by the candidate network model 16. Then, the output classification of the perturbed data containing the Trojan trigger 34 is discriminated by the discriminator D. If the output classification of the candidate network model indicates that the image is no longer a threat, then this would be an indicator that the candidate network model may contain a Trojan that is purposefully or accidentally misclassifying the image. For example, if the data of the sound signature containing the Trojan trigger 34 is classified as a harmless sound, such as birds chirping, then discriminator D will be able to identify that the candidate network model 16 may have been improperly trained or contain a Trojan such that the candidate network model should not be used in future deployments as an artificial intelligence classifier. The discriminator D utilizes probabilities $p(y)$ that the candidate network model 16 includes the Trojan based on the size of the change of the output classification relative to the previous output classifications.

Figure 4:
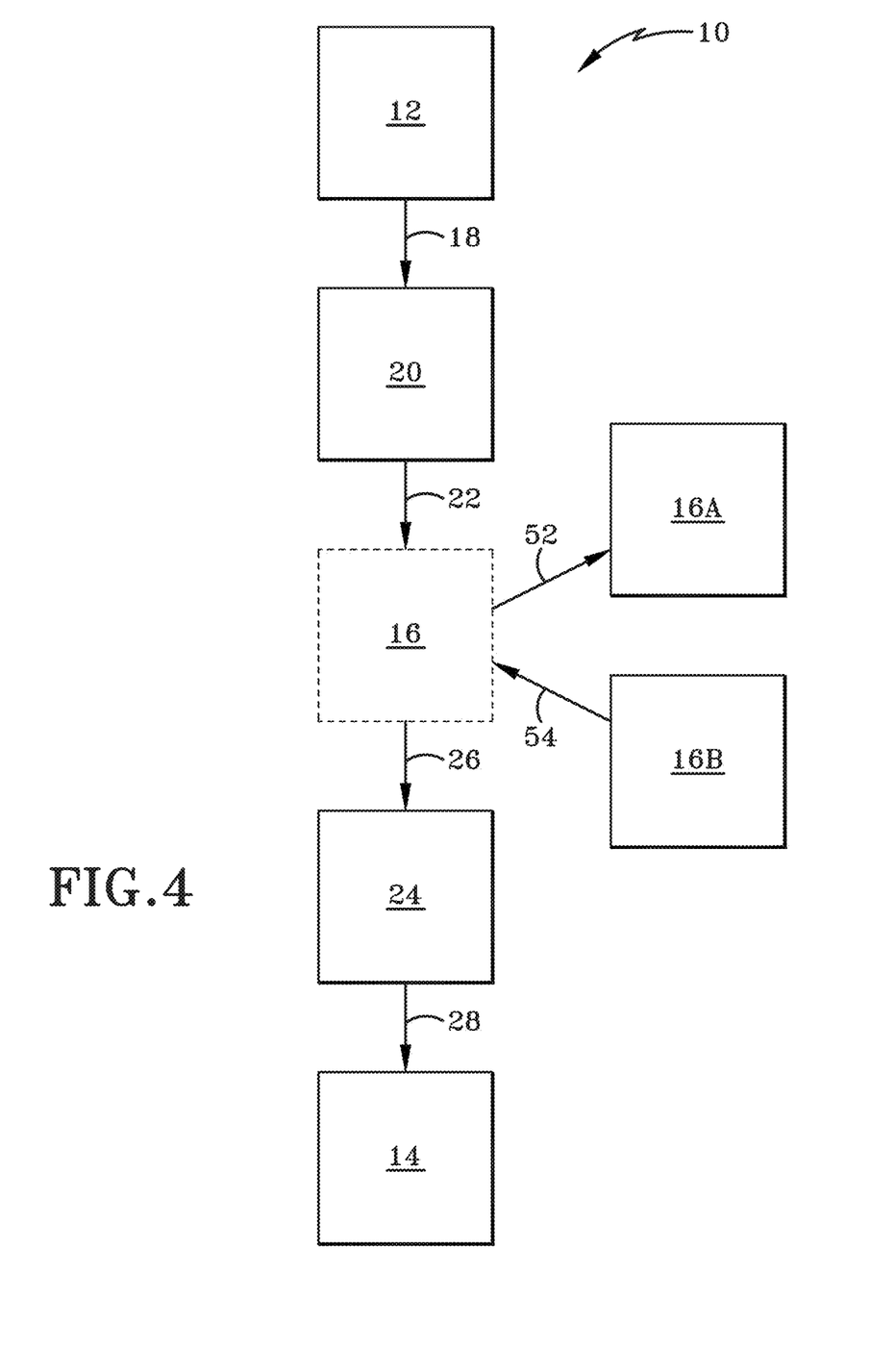
FIG. 4 is a flow chart depicting the replacement and testing of subsequent candidate artificial intelligence models.

FIG. 4 schematically represents that multiple candidate models may be testing using system 10. Namely, portions of system 10 are re-usable that enable multiple candidate network models to be tested in the manner described herein with respect to FIG. 2 and FIG. 3. Namely, a first candidate network model 16A can be tested in accordance with the manner described herein to determine whether it includes a Trojan that would inhibits its operation as a classifier or other type of artificial intelligence network. After the testing of the first candidate network model 16A is complete, it may be removed from system, as schematically shown by Arrow 52. Then, a second candidate network model 16B may be inserted into system 10 in order to test the same. The insertion of the second candidate network model 16B is schematically shown by Arrow 54. After inserting the second candidate network model 16B into system 10, the process identified herein with respect to FIG. 2 and FIG. 3 may be repeated to determine whether the second candidate network model 16B contains any Trojans from when it was trained, which again is typically from an open source environment or a low security environment. If the second artificial intelligence 14 operating as a discriminator D determines that either of the first candidate network model 16A or the second candidate network model 16B includes a Trojan, then that candidate network model may be discarded and not used. If the second artificial intelligence 14 operating as a discriminator D determines that either of the first candidate network model 16A or the second candidate network model 16B does not include any Trojans, then that first candidate network model 16A or the second candidate network model 16B may be disconnected from system 10 and deployed in a subsequent system and provide the operator adequate assurances that it will perform properly and should not provide any misclassifications due to an improper training thereof (i.e., it will not have any Trojans that would result in misclassifications).

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
   providing a candidate artificial intelligence model that has been trained;
   coupling the candidate artificial intelligence model between a first artificial intelligence and a second artificial intelligence;
   inputting a first set of data into the first artificial intelligence;
   generating a first logit from the first artificial intelligence;
   inputting the first logit into the candidate artificial intelligence model;
   outputting a second logit from the candidate artificial intelligence model that is representative of a classification classified by candidate artificial intelligence model;
   inputting the second logit into the second artificial intelligence; and
   determining, via the second artificial intelligence, whether the candidate artificial intelligence model includes a Trojan from when it was trained based on the classification as classified by the candidate artificial intelligence model.

2. The method step 1, further comprising:
   generating a Trojan trigger;
   inputting the Trojan trigger into the first set of data in the first artificial intelligence;
   generating a subsequent logit output from the first artificial intelligence based on the Trojan trigger in the first set of data and feeding the subsequent logit to the candidate artificial intelligence model.

3. The method of claim 2, further comprising:
   comparing, in the second artificial intelligence, the output of the candidate artificial intelligence model based on the first set of data with the output of the candidate artificial intelligence model based on the first set of data having the Trojan trigger;
   determining, based on a probability determination from the second artificial intelligence, whether the candidate artificial intelligence model includes the Trojan from when the candidate artificial intelligence was trained based on the comparison between the output of the candidate artificial intelligence model from the first set of data and the output of the candidate artificial intelligence model from the first set of data having the Trojan trigger.

4. The method of claim 3, further comprising:
   wherein, when the second artificial intelligence determines that the candidate artificial intelligence model has the Trojan, then discarding the candidate artificial intelligence model; and
   wherein, when the second artificial intelligence determine that the candidate artificial intelligence model does not have the Trojan, then deploying the candidate artificial intelligence model in a subsequent system.

5. The method of claim 3, wherein the step of determining is accomplished by comparing a change of the second logit before and after having added the Trojan trigger to the first set of data.

6. The method of claim 1, further comprising:
   feeding, via a first feedback loop, the first logit back to the first artificial intelligence;
   feeding, via a second feedback loop, the second logic output from the candidate artificial intelligence model back to the first artificial intelligence.

7. The method of claim 6, further comprising:
   generating subsequent sets of data with Trojan triggers added to the first and second logits that have been fed back to the first artificial intelligence.

8. The method off claim 1, further comprising:
   determining, in the second artificial intelligence operating as a discriminator, whether the second logit from the candidate artificial intelligence model is a true representation or a false representation of the first logit.

9. The method of claim 8, further comprising:
   determining, in the discriminator, whether the candidate artificial intelligence model correctly classified an object based on perturbations in the first logit.

10. The method of claim 8, further comprising:
    generating perturbations in the first set of data input into the first artificial intelligence to create a perturbed first set of data;
    transmitting the original first set of data to the candidate artificial intelligence model;
    transmitting the perturbed first set of data to the candidate artificial intelligence model;
    generating, via the candidate artificial intelligence model, a first classification based on the original first data and a second classification based on the perturbed first data;
    comparing in the discriminator the classification based on the original first data and the first and second classification based on the perturbed first data;

determining whether the Trojan exists in the candidate artificial intelligence model based on whether the first classification of the original first data and the second classification of the perturbed first data are similar or different.

11. The method of claim 10, further comprising:

repetitively generating additional perturbations in at least one of the first set of data and the perturbed first set of data;

repetitively generating, via the candidate artificial intelligence model, classifications based on the at least one of the first set of data and the perturbed first set of data.

12. The method of claim 11, further comprising:

repetitively generating additional perturbations in both the original first set of data and the perturbed first set of data;

repetitively generating, via the candidate artificial intelligence model, classifications based on both of the first set of data and the perturbed first set of data.

13. The method of claim 10, further comprising:

wherein the first set of data is a first image input into the first artificial intelligence;

wherein the perturbations are formed by generating noise from a random noise generator connected to the first artificial intelligence;

combining the noise with the first image;

transmitting the first image and noise to the candidate artificial intelligence model; and outputting a classification of the first image and noise from the candidate artificial intelligence.

14. The method of claim 13, further comprising:

triggering a Trojan implanted in the candidate artificial intelligence model to misclassify an object in the first image based on the random noise combined with the first image; and detecting the misclassification of the object in the first image via the second artificial intelligence operating as a discriminator connected with the candidate artificial intelligence.

15. The method of claim 10, further comprising:

wherein the first set of data is a sound signature input into the first artificial intelligence;

wherein the perturbations are formed by generating noise from a random noise generator connected to the first artificial intelligence;

combining the noise with the sound signature transmitting the sound signature and noise to the candidate artificial intelligence model;

outputting a classification of the sound signature and noise from the candidate artificial intelligence model.

16. The method of claim 1, further comprising:

determining that the candidate artificial intelligence model contains the Trojan;

disconnecting the candidate artificial intelligence model from the first artificial intelligence and the second artificial intelligence;

discarding the candidate artificial intelligence model;

connecting a second candidate artificial intelligence model to the first artificial intelligence and the second artificial intelligence; and testing the second candidate artificial intelligence model to determine whether the second candidate artificial intelligence model contains a second Trojan in a similar manner to that of the candidate artificial intelligence model.

* * * * *